United States Patent [19]

Langstein et al.

[11] Patent Number: 5,554,689
[45] Date of Patent: Sep. 10, 1996

[54] COMBINATIONS OF POLYORGANOSILOXANES AND FLUORORUBBERS CONTAINING DOUBLE BONDS BY SI-H ADDITION

[75] Inventors: Gerhard Langstein, Kuerten-Biesfeld; Ralf Krüger, Bergisch Gladbach; Heinrich Alberts, Odenthal; Hans-Heinrich Moretto; John Huggins, both of Leverkusen, all of Germany

[73] Assignee: Bayer Aktiengesellschaft, Leverkusen, Germany

[21] Appl. No.: 344,780

[22] Filed: Nov. 23, 1994

Related U.S. Application Data

[63] Continuation of Ser. No. 93,121, Jul. 16, 1993, abandoned.

[30] Foreign Application Priority Data

Jul. 24, 1992 [DE] Germany .......................... 42 24 559.1

[51] Int. Cl.[6] .................................................. C08F 8/00
[52] U.S. Cl. .............................................. 525/102; 575/104
[58] Field of Search .................................. 525/102, 104, 525/105

[56] References Cited

U.S. PATENT DOCUMENTS

| | | | |
|---|---|---|---|
| 3,415,900 | 12/1968 | Robb | 525/104 |
| 3,538,028 | 11/1970 | Morgan | 525/104 |
| 3,865,897 | 2/1975 | Falender et al. | 525/100 |
| 3,969,308 | 7/1976 | Penneck | 260/37 B |
| 4,028,431 | 6/1977 | Futami et al. | 524/104 |
| 4,260,698 | 4/1981 | Tatemoto et al. | 525/102 |
| 4,263,414 | 4/1981 | West | 525/102 |
| 4,314,043 | 2/1982 | Kojima | 525/102 |
| 4,430,406 | 2/1984 | Newkirk | 430/99 |
| 4,450,263 | 5/1984 | West | 526/249 |
| 4,810,577 | 3/1989 | Ikegaya | 428/391 |
| 4,904,529 | 2/1990 | Ikegaya | 428/377 |
| 4,942,202 | 7/1990 | Zama et al. | 525/104 |
| 4,946,883 | 8/1990 | Kunimatsu et al. | 524/265 |
| 4,985,483 | 1/1991 | Saito et al. | 524/265 |
| 5,010,137 | 4/1991 | Umeda et al. | 525/104 |
| 5,132,366 | 7/1992 | Kashida et al. | 525/102 |
| 5,214,115 | 5/1993 | Langstein et al. | 526/247 |
| 5,247,036 | 9/1993 | Kruger et al. | 526/255 |

FOREIGN PATENT DOCUMENTS

| | | |
|---|---|---|
| 057691 | 11/1986 | European Pat. Off. . |
| 344481 | 5/1989 | European Pat. Off. . |
| 1451719 | 7/1966 | France . |
| 2141879 | 3/1973 | Germany . |
| 2519964 | 11/1975 | Germany . |
| 4023960 | 1/1992 | Germany . |

OTHER PUBLICATIONS

Russian Chemical Reviews, 46 (3), 1977, Lukevics, Latest Research on the Hydrosilylation Reaction.

*Primary Examiner*—Ralph H. Dean
*Attorney, Agent, or Firm*—Sprung Horn Kramer & Woods

[57] ABSTRACT

A chemically linkable mixture comprising
(a) about 98 to 80% by weight of a fluoroelastomer bearing lateral olefinic double bonds,
(b) about 2 to 20% by weight of at least one of a silicone oligomer, silicone elastomer and a fluorosilicone elastomer containing Si—H groups, and
(c) a catalyst containing at least one of a noble metal and an organic peroxide.

Fluororubbers made therefrom are distinguished by excellent physical properties.

14 Claims, No Drawings

COMBINATIONS OF POLYORGANOSILOXANES AND FLUORORUBBERS CONTAINING DOUBLE BONDS BY SI-H ADDITION

This application is a continuation of application Ser. No. 08/093,121, filed Jul. 16, 1993, now abandoned.

Fluororubbers (FR) based on vinylidene fluoride, hexafluoropropene and, optionally, tetrafluoroethylene give vulcanizates having satisfactory mechanical properties and high resistance to heat, oil, ozone and irradiation.

By virtue of these properties, applications hitherto not possible with any other type of rubber have been opened up by fluororubbers. However, a major disadvantage of fluororubbers is their extremely poor flexibility at low temperatures. The glass temperatures of commercially available fluoro elastomers based on VDF/HFP/TFE are in the range from 0° to −20° C. The glass temperature cannot be reduced any further by changing the composition of the polymers. The use of perfluorovinyl methyl ether terpolymers, which have glass temperatures down to −30° C., is limited by their high price.

At the same time, polyorganosiloxanes (QM) by comparison with fluororubbers are inexpensive products which have an extremely low glass temperature (<−100° C.) and of which the vulcanizates are distinguished by good hot air ageing and high ozone resistance. Their tensile strength and tear propagation resistance and their resistance to hot aggressive media are less favorable. Although the more expensive fluorosilicone [poly(methyl)(trifluoropropyl)siloxanes] have improved low temperature properties ($T_g$ −68° C.), their stability in hot aggressive media is distinctly lower than that of fluororubbers. Accordingly, numerous attempts have been made to combine fluororubbers and silicone rubbers. However, the obvious combination in the form of a simple blend is unsuccessful because of the incompatibility of the two classes of polymers.

Prior art

Nevertheless, numerous efforts have been made in recent years to combine these two classes of polymer. It has always been attempted in this regard to mix and co-vulcanize the two elastomers. Even when a crosslinking system applicable to both systems was selected, it was not possible to obtain saleable products.

FR-A 1 451 719 describes fluororubber/silicone rubber mixtures with a silicone content of <15%. In this case, the two polymers are vulcanized alongside one another. The fluororubber is vulcanized with a bis-amine while the silicone rubber is vulcanized with a peroxide. The two rubbers are not co-vulcanized, resulting in poor vulcanizate properties.

U.S. Pat. No. 3,415,900 describes the peroxidic co-vulcanization of chlorine-containing fluoroelastomers and silicones.

Fluororubber/VQM mixtures containing less than 15% silicone are described as having improved processing behavior in U.S. Pat. No. 3,538,028. This is achieved by addition of a liquid fluoropolymer to the mixture. The fluoropolymers are again crosslinked with a bis-amine while the silicone phase is vulcanized with a peroxide.

EP-A 270 028 describes peroxidic vulcanizates for the production of rubber stoppers which are obtained from functionalized fluororubbers and functionalized silicones.

U.S. Pat. No. 3,865,897 describes the production of blends of vinyl-containing polydimethyl siloxane and vinyl polymers, including tetrafluoroethylene/ethylene copolymers. The materials are said to be used for insulating purposes.

DE-A 21 41 879 describes the peroxidic co-vulcanization of silicone and fluororubbers with simultaneous bonding to metal surfaces.

U.S. Pat. No. 3,969,308 describes peroxidically vulcanizable mixtures of silicone and vinyl (also fluoro) polymers, emphasizing as a special feature the fact that a silanized filler is first mixed with the silicone polymer.

U.S. Pat. No. 4,028,431 also describes peroxidically vulcanizable mixtures of fluororubbers with silicones. Although the vulcanizates show better low-temperature properties with increasing silicone content, their mechanical properties deteriorate.

DE-A 25 19 964 describes peroxidically vulcanizable mixtures of fluororubbers, more particularly ethylene/hexafluoropropene/tetrafluoroethylene terpolymers, with silicones.

U.S. Pat. No. 4,260,698 describes peroxidically vulcanizable blends of iodine-containing fluororubbers and (fluoro) silicone rubbers.

U.S. Pat. No. 4,263,414 and WO 81/0073 describe the peroxidic co-crosslinking of fluororubbers containing bromine cure sites with fluorosilicones. In this case, too, the improvement in the low-temperature properties is acquired at the expense of a deterioration in the mechanical properties. U.S. Pat. No. 4,450,263 goes further along this path.

WO 82/00606 describes fluoroelastomer films crosslinked with epoxy- or amino-substituted silanes.

U.S. Pat. No. 4,810,577 describes peroxidically vulcanizable mixtures of fluoropolymers with silicones for cable insulations.

U.S. Pat. No. 4,904,529 describes heat- and oil-resistant peroxidically vulcanizable mixtures of AFLAS (TEE/propene copolymeer) and silicones which are used for insulating purposes.

EP-A 279 414 describes mixtures of silicone polymers and organic polymers, including fluoropolymers. Crosslinking of the silicone phase is Pt-catalyzed while crosslinking of the fluororubber phase is peroxide-catalyzed.

EP-A 295 717 describes peroxidically or ionically vulcanizable mixtures based on fluoroelastomers and modified olefinic polymers in which the fluoroelastomer may even be a fluorosilicone.

EP-A 344 481 describes the coating of films with a fluoroelastomer/silicone co-vulcanizate, vulcanization being carried out with a bisphenol.

EP-A 365 967 describes mixtures of fluororubbers (VITON E 430, DAIEL G 901) with particulate crosslinked silicone rubbers. Crosslinking of the silicone rubber particles may be Pt-, Sn- or peroxide-catalyzed.

EP-A 380 104 describes peroxidically vulcanizable mixtures of fluorinated and silicone rubbers. Improved processability is obtained by addition of epoxy-substituted silicone.

DE-A 29 49 135 describes peroxidically vulcanizable mixtures of iodine-containing fluoroelastomers and (fluoro) silicone elastomers.

U.S. Pat. No. 4,942,202 describes three-component rubber mixtures with good processability on mixing rolls. Component I is said to be a fluorosilicone for example; component II is not crosslinkable with the silicone rubber, but forms the continuous phase, component II is a fluorinated or acrylate rubber co-crosslinkable with component I (VITON GF, Daiel G 902, JSR AR 101).

All hitherto known FR/VQM mixtures are attended by two main problems which the present invention seeks to solve, namely:

1. In principle, the two rubbers are completely incompatible.
2. Co-crosslinking is very inhomogeneous because the two classes of polymer differ in their crosslinking behavior so that crosslinking takes place preferentially in the pure phases A and B. Co-vulcanization takes place to only a limited extent.

The problem addressed by the present invention was to produce combinations of FR and MQ which are molecularly coupled by chemical linking of fluororubbers and polydiorganosiloxane oligomers and/or polymers, form a homogeneous polymer phase and are distinguished by a sharp, uniform glass transition lying between that of the originally pure FR and silicone component.

According to the invention, the solution to this problem is characterized in that fluororubbers bearing lateral olefinic double bonds, as illustrated in formula I below, are reacted with polyorgano-H-siloxane oligomers or polymers.

$$\text{F-polymer-X—CH=CH}_2 \quad (I)$$

This Si—H addition onto a terminal C,C double bond, which is known from silicone chemistry, is carried out thermally, radically or by noble metal complex catalysis in solution or bulk in accordance with the following scheme:

$$P—X—CH=CH_2 + —Si—H \rightarrow P—X—CH_2—CH_2—Si—$$

Vulcanized moldings are either produced in a single step, in which case the Si—H addition itself is used to build up the network., or after the Si—H addition which, in this case, is only continued as far as fluororubbers having silicone grafting trunks to which a crosslinking system suitable for the fluororubber is then added.

Suitable fluororubbers are those bearing lateral double bonds which are produced by copolymerization of fluoromonomers with small quantities of suitable monomers containing at least two olefinic double bonds, such as alkenyl isocyanurates, alkenyl cyanurates and/or unconjugated dienes; see DE-A 4 038 588 and hitherto unpublished DE-A 4 114 598. They must be flowable and, accordingly, should not be present in the crosslinked state, i.e. they should have gel contents of not more than 10% by weight.

In the context of the invention, the polyorgano-H-siloxanes which may be used for the grafting of fluororubbers containing unsaturated groups are, for example, those which contain at least one Si—H group per molecule and which should be copolymers containing units having the following average formulae:

$$(R)_a SiO_{(4-a)/2} \quad (II)$$

$$H_b(R)_a SiO_{(4-a-b)/2} \quad (III)$$

in which the R's may be the same or different and represent monofunctional hydrocarbon radicals free from aliphatically unsaturated bonds. The substituents R are preferably all methyl radicals. The factor "a" may assume a value of 0 to 2.5 and the factor b may assume s value of 0.0005 to 1. Copolymers such as these generally consist of 50 to 99.9999 mol-% units of (II) and 0.0001 to 50 mol-% (III).

These polyorgano-H-siloxanes have a viscosity in the range from 10 to 10,000 mPas/25° C. and preferably in the range from 50 to 1,000,000 mPas/25° C.

The Si—H group should preferably be terminally positioned, although it may also be arranged along the chain.

Examples of polyorgano-H-siloxanes corresponding to formula (III) are 1-hydrido-1,1,3,3,3-pentamethyl disiloxane, 1-hydrido-1,1,3,3,4,4,4-octamethyl disiloxane and homologs thereof.

The polyorgano-H-siloxanes which may be used for grafting and/or at the same time for crosslinking fluoro-rubbers containing unsaturated groups should be copolymers of units corresponding to formulae (II) and (III).

Other polyorgano-H-siloxanes which may be used for grafting have the formula:

$$(R)_c(H)_d SiO_{(4-c-d)/2} \quad (IV)$$

R is identical with the constituents R in formulae II and III; c may assume a value of 0, 1 or 2 and the sum of c+d must be 1, 2 or 3.

Copolymers of the above type generally contain 50 to 99.9999 mol-% units of (II) and 0.0001 to 50 mol-% units of (III). The polyorgano-H-siloxanes have a viscosity of 10 to 1,000,000 mPas/25° C. Examples of such polyorgano-H-siloxanes corresponding to formula (IV) are 1,3-dimethyl disiloxane, 1,1,3,3-tetramethyl disiloxane and homologs thereof.

In general, suitable catalysts for the Si—H addition onto carbon double bonds are the noble metalcatalysts described by Lukevics in Russ. Chem. Rev. 46, 246 (1977).

Suitable catalysts for the addition of Si-bonded hydrogen onto terminal carbon double bonds are, in particular, platinum catalysts which have hitherto been used for the production of compounds curable to elastomers with organopolysiloxane containing vinyl groups. These catalysts include platinum compounds, such as hexachloroplatinic acid, platinum complexes, platinum/olefin complexes, platinum/alcohol complexes, platinum/ether complexes, platinum/aldehyde complexes, platinum/vinyl siloxane complexes, and platinum on supports such as silica gel or carbon powder.

Platinum catalysts, such as hexachloroplatinic acid and platinum-1,3-divinyl-1,1,3,3-tetramethyl disiloxane complexes, are preferably used. The platinum catalyst is used in quantities of 0.5 to 1,000 ppm, expressed as elemental platinum and based on the total weight of the organopolysiloxanes and fluoropolymers.

The addition of Si—H groups onto terminal C,C double bonds may also be carried out with peroxides. Peroxides suitable for this purpose are inter alia dibenzoyl peroxide, N,N'-azo-bis-isobutyronitrile, t-butyl peracetate, di-t-butyl peroxide, and methyl and amyl ketone peroxide.

The preparation of a fluororubber/silicone rubber mixture with subsequent Si—H addition onto vinyl groups may be carried out in bulk, solution or emulsion. The mixture is preferably produced in bulk using kneaders or mixing rolls. Where the reaction is carried out in solution, solvents in which both classes of substance may be dissolved, are preferably used, such as for example dimethylformamide or dimethylacetamide.

EXAMPLES

1. Production of the fluoropolymers bearing lateral double bonds

Example 1A 2,500 ml deionized water were introduced into a 6 liter autoclave. 9 g lithium perfluorooctane sulfonate and 15 g potassium peroxydisulfate were dissolved therein. The resulting solution had a pH value of 11. The closed autoclave was then placed three times under a nitrogen pressure of 10 bar and subsequently vented to normal pressure. 640 g hexafluoropropene and 486 g vinylidene fluoride were introduced into the autoclave and the reaction mixture was heated with stirring to 50° C. After the temperature of 50° C. had been reached, the pressure inside the autoclave was 33 bar. The polymerization was initiated by the continuous addition of 50 ml per hour of an aqueous solution which contained 2 g triethanolamine and in which 1.9 g triallyl isocyanurate were also dispersed. During the polymerization, which was reflected in the beginning of a reduction in pressure after 17 minutes, a monomer mixture consisting of 180 g vinylidene fluoride and 120 g hexafluoropropene was continuously introduced under pressure over a period of 80 minutes to maintain the initial pressure. To complete the polymerization, the contents of the autoclave were cooled and the unreacted gas mixture was vented. A coagulate-free aqueous emulsion which had a pH value of 4.3 for a solids content of 13% was obtained. To coagulate the product, the emulsion was acidified with dilute sulfuric acid to a pH value of approx. 2 and poured into 3,000 ml of a 4% aqueous magnesium sulfate solution. The product was washed with water and then dried, giving 360 g of a rubber-like copolymer containing vinylidene fluoride, hexafluoropropene and triallyl isocyanurate. The copolymer is soluble in solvents such as dimethyl formamide, dimethyl acetamide, acetone, methyl ethyl ketone and tetrahydrofuran; it had an intrinsic viscosity of 2.2 dl/g (DMF/25° C.). The molar ratio of vinylidene fluoride to hexafluoropropene in the copolymer was determined by $^{19}F$ nuclear resonance spectroscopy and is 81:19. The content of copolymerized TAiC of 0.7% by weight was determined by nitrogen elemental analysis. The presence of free double bonds could be detected by addition of iodine bromide. The HANUS iodine value is 2.0 g iodine/100 g polymer. The crude polymer has a Mooney value $ML_4$ (100° C.) of 147.

Vulcanization:

A mixture of 100 parts by weight fluororubber with 3 parts by weight calcium hydroxide, 30 parts by weight carbon black MT Black N 990, 4 parts by weight Percalink 301-50 (triallyl isocyanurate, 50% in inactive fillers) and 3 parts by weight Percadox 14/40 K [1,3-bis-(t-butylperoxy-isopropyl)-benzene, 40% in inactive fillers] was prepared on two-roll rubber mixing rolls. The mixture was pressure-vulcanized for 20 minutes at 180° C. This was followed by post-curing by heating the moldings(100×100×1 mm pressed squares) in stages for 4 h to 200° C. in a recirculating air oven (1 h/160° C., 1 h/170° C., 2 h/180° C.) and heating for 20 hours at that temperature.

The resulting vulcanizate (100×100×1 mm squares) has the following mechanical properties:

Hardness 77 Shore A

Tensile strength [N/mm² ]24.5 N/mm²

Elongation at break 340% .

In a temperature-dependent shear modulus measurement (Brabender Torsionsautomat), this vulcanized fluororubber shows a glass transition at −10° C.

Example 1B

Following the procedure described in Example 1A, 320 g HFP, 180 g VDF, 3 g TAiC and 1 g perfluorobutyl iodide were added to the deionized water and a mixture of 200 g hexafluoropropene and 300 g vinylidene fluoride was introduced into the autoclave under pressure over a period of 14 h to maintain the initial pressure with continuous addition of triethanoiamine at a rate of 1.5 g/h. A mixture of 3.8 parts by weight TAiC, 0.08 part by weight perfluorobutyl iodide and 2.6 parts by weight methyl acetate per 100 parts by weight F monomers was pumped into the autoclave at the same time as the fluoromonomers. The resulting rubber polymer consists of 76.1% VDF, 23.5% HFP and 0.43% TAiC (%=mol-%). The HANUS iodine value is 1.3 g iodine/100 g polymer. The crude polymer has a Mooney value ML 10 (100° C.) of 94.

Example 1C

Following the procedure described in 1A, 153 g hexafluoropropene and 126 g vinylidene fluoride were introduced into the autoclave over a period of 4.5 h to maintain the initial pressure with continuous addition of triethanolamine at a rate of 3.3 g/h and triallyl isocyanurate at a rate of 1 g/h.

The resulting rubber polymer consists of 80.8% VDF, 18.9% HFP and 0.2% TAiC (%=mol-%). The copolymer is also soluble in the solvents listed in 1A; it has an intrinsic viscosity of 1.0 dl/g (DMF/25° C.). The HANUS iodine value is 1.0 g iodine/100 g polymer.

2. Production of polyorgano-H-siloxanes

Example 2A 17.37 g tetramethyl disiloxane, 21.01 g hexamethyl disiloxane and 961.61 g octamethyl cyclotetrasiloxane are introduced under nitrogen into a 2 liter stirred tank reactor, followed by addition of 1.0 g sulfuric acid and 0.5 g perfluorobutane sulfonic acid. The mixture is then heated to 70° C. and stirred for 4 hours at 70° C. After addition of 2.63 g ammonium carbonate, the mixture is stirred for 30 minutes and the pH value of the gas phase is tested. If the gas phase is not basic, another 2.63 g ammonium carbonate are added and the mixture is stirred for 30 minutes. If the gas phase is basic, the mixture is cooled and filtered with 1% silica. The filtrate is heated to 150° C. under a pressure of approx. 1 mbar.

3. Production of an FR/polyorgano-H-siloxane co-vulcanizate

Example 3A

In a Haake laboratory compounder with cam-type rotors (50 ml), 40 g of the fluororubber of Example 1C were compounded for 15 minutes at 120° C. with 2.7 g polyorgano-H-siloxane [(CH₃)HSiO]₃₀, viscosity: 15 mPas/25° C., mixed with 2.7 g carbon black MT Black N 990, and 2.7 g tetramethyl tetravinyl cyclotetrasiloxane mixed with 2.7 g carbon black MT Black N 990. The product was soluble in dimethyl formamide at 25° C. Press vulcanizates were produced from the product (30 minutes, 200 bar, 175° to 180° C.). A single glass transition was observed at −28.5° C (temperature-dependent shear modulus measurement using a Brabender Torsion-automat).

Example 3B

In a Haake laboratory compounder with cam-type rotors (50 ml), 40 g of the fluororubber of Example 1C were mixed at 120° C. with 2.7 g polyorgano-H-siloxane (see above) mixed with 2.7 g carbon black MT Black N 990. 2.7 g platinum catalyst (370 ppm Pt) mixed with 2.7 g carbon black MT Black N 990 were then added and compounded while cooling. Press vulcanizates were produced from the product (30 mins., 200 bar, 175° to 180° C.). The product was insoluble in dimethyl formamide at 100° C. A single glass transition was observed at −24° C. (temperature-dependent shear modulus measurement using a Brabender Torsionautomat.

4. Production of an FR/polyorgano-H-graft product

Example 4A 85 g of the fluororubber of Example 1B were compounded for 5 minutes at 40° C. in a Haake laboratory compounder (65 ml). 4 g polyorgano-H-siloxane of the composition [((CH$_3$)HSiO)$_2$O((CH$_3$)$_2$SiO)$_2$O] with a viscosity of 40 mPas/25° C. (Example 2A) mixed with 4 g VULKASIL S were then added and the mixture was compounded for 5 minutes at 40° C. The platinum catalyst (400 ppm Pt) was then added and the mixture was compounded for another 15 minutes at 40° C., the temperature rising to 80° C.

Example 4B

A mixture of 100 parts by weight of the silicone-modified fluororubber produced in accordance with Example 3A with 3 parts by weight calcium hydroxide, 30 parts by weight carbon black MT Black N 990, 4 parts by weight Percalink 301-50 (triallyl isocyanurate, 50% inactive fillers) and 3 parts by weight Percadox 14/40 K (a product of Akzo: 1,3-bis-(t-butylperoxyisopropyl)-benzene, 40% chalk) was prepared on two-roll rubber mixing rolls. The mixtures were pressure-vulcanized for 20 minutes at 180° C. This was followed by fast-curing by heating of the moldings (100× 100×1 mm pressed squares) in stages for 4 h to 200° C. in a recirculating air oven (1 h/160° C., 1 h/170° C., 2 h/180° C.) and heating at that temperature for 20 hours.

The resulting vulcanizate has a hardness (Shore A) of 69.8 and, in a temperature-dependent shear modulus measurement (Brabender Torsionautomat), shows a sharp glass transition at −13° C.

Example 4C (Comparison Example)

A vulanized molding of the pure non-silicone-modified fluororubber of Example 1B was prepared by the method described in Example 3B. Temperature-dependent shear modulus measurement shows a glass transition at −6° C.

Example 5 a) 79 g of the fluororubber of Example 1B were compounded for 5 minutes at 40° C. in a Haake laboratory compounder (65 ml). 16.73 g polyorgano-H-siloxane of the composition (CH$_3$HSiO)$_{20}$[(CH$_3$)$_2$SiO)$_{20}$ with a viscosity of 40 mPas/25° C. mixed with 8.37 g VULKASIL S were then added and the mixture was compounded for 5 minutes at 40° C. The platinum catalyst (400 ppm Pt) was then added and the mixture was compounded for 15 minutes at 80° C.

b) Vulcanization mixture 50 Parts by weight of the silicone-modified fluororubber produced in accordance with 5 a) were first mixed with 50 parts by weight of the fluororubber of Example 1A on two-roll rubber mixing rolls. The resulting rubber mixture was then processed to vulcanized moldings by the method described in Example 3B. The vulcanizate had a hardness (Shore A) of 68, a tensile strength of 20 MPa and an elongation of 275%. In the temperature-dependent shear modulus measurement, a glass transition was observed at −12° C. The similarly vulcanized mixture of the pure fluororubbers of Examples 1A and 1C shows a glass transition at −7° C.

The properties of the vulcanizates of Examples 3 to 5 are compared in Table 1.

TABLE 1

Glass transition temperatures and mechanical properties of the vulcanizates of Examples 3 to 5

| Property | Example 3 | Example 4 Comparison | Example 5 |
|---|---|---|---|
| Hardness [Shore A] | 69.8 | 63 | 68 |
| Tensile strength [N/mm$^2$] | 10.2 | 7.4 | 20 |
| Elongation at break [%] | 340 | 405 | 275 |
| Glass transition temperature [°C.] | −13 | −6 | −12 |

It will be understood that the specification and examples are illustrative but not limitative of the present invention and that other embodiments within the spirit and scope of the invention will suggest themselves to those skilled in the art.

We claim:

1. A chemically linkable mixture which comprises
   (a) about 98 to 80% by weight of a fluororubber containing lateral olefinic double bonds and produced by copolymerization of vinylidene fluoride, hexafluoropropene and a member of the group consisting of alkenyl isocyanurates, alkenyl cyanurates and combinations thereof,
   (b) about 2 to 20% by weight of at least one member selected from a group consisting of a slicone oligomer, silicone elastomer and a fluorosilicone elastomer, each of which contains Si—H groups, and
   (c) a catalyst which contains at least one noble metal or an organic peroxide.

2. A mixture according to claim 1, wherein the catalyst (c) is present in about 0.5 to 1,000 ppm based on the weight of the mixture.

3. A mixture according to claim 2, wherein the catalyst contains platinum.

4. A mixture according to claim 1, further containing at least one of a filler, dye or stabilizer.

5. A mixture according to claim 1, wherein the catalyst contains platinum, and further containing at least one of a filler, dye or stabilizer.

6. A chemically linkable mixture which comprises
   (a) about 98 to 80% by weight of a fluororubber containing lateral olefinic double bonds and produced by copolymerization of vinylidene fluoride, hexafluoropropene, tetrafluoroethylene and a member of the group consisting of alkenyl isocyanurates, alkenyl cyanurates and combinations thereof,
   (b) about 2 to 20% by weight of at least one member selected from the group consisting of a silicone oligomer, silicone elastomer and a fluorosilicone elastomer, each of which contains Si—H groups, and
   (c) a catalyst which contains at least one noble metal or an organic peroxide.

7. A process for the production of a chemically linked fluororubber and a polydioganosiloxane oligomer or polymer which comprises reacting together a mixture which consists essentially of
   (a) about 98 to 80% by weight of a fluororubber containing lateral olefinic double bonds and produced by copolymerization of vinylidene fluoride, hexafluoropropene and a member of the group consisting of alkenyl isocyanurates, alkenyl cyanurates and combinations thereof, (b) about 2 to 20% by weight of at least one member of the group consisting of a silicone oligomer, silicone elastomer and a fluorosilicone elastomer each of which contains Si—H groups, and (c) a catalyst which contains a noble metal or an organic peroxide.

8. The process according to claim 7, wherein the reaction takes place by heating.

9. The process according to claim 7, wherein the catalyst contains an organic peroxide.

10. The process according to claim 7, wherein the reaction is performed through a noble metal complex.

11. The process according to claim 7, wherein the reaction is performed in bulk.

12. The process according to claim 7 wherein the reaction is performed in solution.

13. The process according to claim 8, wherein the catalyst contains an organic peroxide.

14. A process for the production of a chemically linked fluororubber and a polydioganosiloxane oligomer or polymer which comprises reacting together a mixture which consists essentially of (a) about 98 to 80% by weight of a fluororubber containing lateral olefinic double bonds and produced by copolymerization of vinylidene fluoride, hexafluoropropene, tetrafluoroethylene and a member of the group consisting of alkenyl isocyanurates, alkenyl cyanurates and combinations thereof, (b) about 2 to 20% by weight of at least one member of the group consisting of a silicone oligomer, silicone elastomer and a fluorosilicone elastomer each of which contains Si—H groups, and (c) a catalyst which contains a noble metal or an organic peroxide.

* * * * *